(12) United States Patent
Chen et al.

(10) Patent No.: US 10,275,868 B2
(45) Date of Patent: Apr. 30, 2019

(54) OBJECT ANALYZING METHOD AND OBJECT ANALYZING SYSTEM

(71) Applicant: MEDIATEK INC., Hsin-Chu (TW)

(72) Inventors: Chun-Chia Chen, Hsinchu (TW); Liang-Che Sun, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 114 days.

(21) Appl. No.: 15/196,054

(22) Filed: Jun. 29, 2016

(65) Prior Publication Data
US 2017/0004380 A1  Jan. 5, 2017

Related U.S. Application Data

(60) Provisional application No. 62/187,263, filed on Jul. 1, 2015.

(51) Int. Cl.
*G06T 7/00* (2017.01)
*G06K 9/62* (2006.01)

(52) U.S. Cl.
CPC .......... *G06T 7/0004* (2013.01); *G06K 9/6267* (2013.01); *G06K 2209/17* (2013.01); *G06T 2207/10024* (2013.01); *G06T 2207/10132* (2013.01); *G06T 2207/20004* (2013.01); *G06T 2207/30128* (2013.01); *G06T 2207/30132* (2013.01)

(58) Field of Classification Search
None
See application file for complete search history.

(56) References Cited

U.S. PATENT DOCUMENTS

| | | | | |
|---|---|---|---|---|
| 5,589,209 A | * | 12/1996 | Mizrach | G01N 29/07 426/231 |
| 7,191,698 B2 | * | 3/2007 | Bond | F24C 7/08 99/330 |
| 2011/0164033 A1 | * | 7/2011 | Kitazawa | G01N 29/069 345/419 |
| 2013/0187835 A1 | * | 7/2013 | Vaught | G06K 9/00604 345/8 |

(Continued)

FOREIGN PATENT DOCUMENTS

| CN | 102095797 A | 6/2011 |
|---|---|---|
| CN | 102175775 A | 9/2011 |

(Continued)

OTHER PUBLICATIONS

Liu, Development of ultrasonic technology used in food production inspection and food safety analysis, 1009-8143(2008)04-0027-05, Fujian Analysis & Testing, 2008, 17(4), p. 27-31.

(Continued)

*Primary Examiner* — Delomia L Gilliard
(74) *Attorney, Agent, or Firm* — Winston Hsu

(57) ABSTRACT

An object analyzing method applied to an object analyzing system. The object analyzing method comprises: (a) applying at least one analyzing parameter extracting process according to an object type for an target object, to extract at least one analyzing parameter for the target object; (b) selecting least one analyzing model according to the object type; and (c) applying the analyzing model selected in the step (b), to analyze the analyzing parameter and accordingly generate an analyzing result.

16 Claims, 7 Drawing Sheets

(56) References Cited

U.S. PATENT DOCUMENTS

2016/0253466 A1* 9/2016 Agaian ................ G06N 3/0427
                                                              382/128

FOREIGN PATENT DOCUMENTS

| CN | 102095797 B | * | 10/2012 |
| CN | 102175775 B | * | 5/2013 |
| CN | 103105432 A | * | 5/2013 |
| CN | 103868821 A | * | 6/2014 |
| JP | 10062362 A | * | 3/1998 |
| JP | 2002168807 A | * | 6/2002 |
| JP | 2004171342 A | * | 6/2004 |
| KR | 20080062106 A | * | 7/2008 |

OTHER PUBLICATIONS

Liu, Experimental measurement equipment for monitoring the liquid foods based on the ultrasonic transmission properties, Transactions of the CSAE, 2004, Sept, vol. 20, No. 5, p. 182-185.

* cited by examiner

OBJECT ANALYZING METHOD AND OBJECT ANALYZING SYSTEM

CROSS REFERENCE TO RELATED APPLICATIONS

This application claims the benefit of U.S. Provisional Application No. 62/187,263, filed on Jul. 1, 2015, the contents of which are incorporated herein by reference.

BACKGROUND

A modern electronic device can provide a plurality of functions, for example, image capturing, music playing, email receiving and sending. Sometimes a user may want to see an inside image for an object, or to acquire inside state information for an object. For example, the user's house has a water leaking problem thus the user may want to see the inside image for the wall. For another example, the user may want to buy some fruits from a market, but does not know how to choose sweet fruits. Accordingly, the user may want to acquire inside state information for the apples.

However, a modern electronic device always can't provide the above-mentioned inside images or inside state information. Also, some ultrasound devices can use ultrasound to analyze an object, but always has a high price or needs complicated control steps.

Further, a conventional ultrasound device always uses a single analyzing step to analyze the object, thus the analyzing result is not detail enough.

SUMMARY

Therefore, one objective of the present application is to provide an object analyzing system that can analyze an object anywhere.

Another objective of the present application is to provide an object analyzing system that can analyze an object more precisely.

One embodiment of the present application discloses an object analyzing method applied to an object analyzing system. The object analyzing method comprises: (a) applying at least one analyzing parameter extracting process according to an object type for an target object, to extract at least one analyzing parameter for the target object; (b) selecting at least one analyzing model according to the object type; and (c) applying the analyzing model selected in the step (b), to analyze the analyzing parameter and accordingly generate an analyzing result.

Another embodiment of the present application discloses an object analyzing system comprising an analyzing module. The analyzing module is configured to perform following steps: (a) apply at least one analyzing parameter extracting process according to an object type for an target object, to extract at least one analyzing parameter for the target object; (b) select at least one analyzing model according to the object type; and (c) apply the analyzing model selected in the step (b), to analyze the analyzing parameter and accordingly generate an analyzing result.

Another embodiment of the present application discloses an object analyzing system, comprising an analyzing module. The analyzing module is configured to perform following steps: (a) apply ultrasound to perform at least one analyzing parameter extracting process according to an object type for an target object, to extract at least one analyzing parameter for the target object; (b) select at least one analyzing model according to the object type; and (c) apply the analyzing model selected in the step (b), to analyze the analyzing parameter and accordingly generate an analyzing result; wherein the step (b) acquires at least one following inside state information of the target object according to the analyzing model: sweetness, hardness, material quality, and rot level.

In view of above-mentioned embodiments, the function of object analyzing can be performed via a portable electronic device, thus is convenient for a user. Besides, the analyzing parameter extracting process and the analyzing model can be selected according to a testing result. By this way, the analyzing result can be more precise.

These and other objectives of the present invention will no doubt become obvious to those of ordinary skill in the art after reading the following detailed description of the preferred embodiment that is illustrated in the various figures and drawings.

DETAILED DESCRIPTION

In the following, several embodiments are provided to explain the concept of the present application. It will be appreciated that the system, the device, the device or the module depicted in following embodiments can be implemented by hardware (ex. circuit) or the combination of hardware and software (ex. a processing unit executing at least one program).

Figure 1:
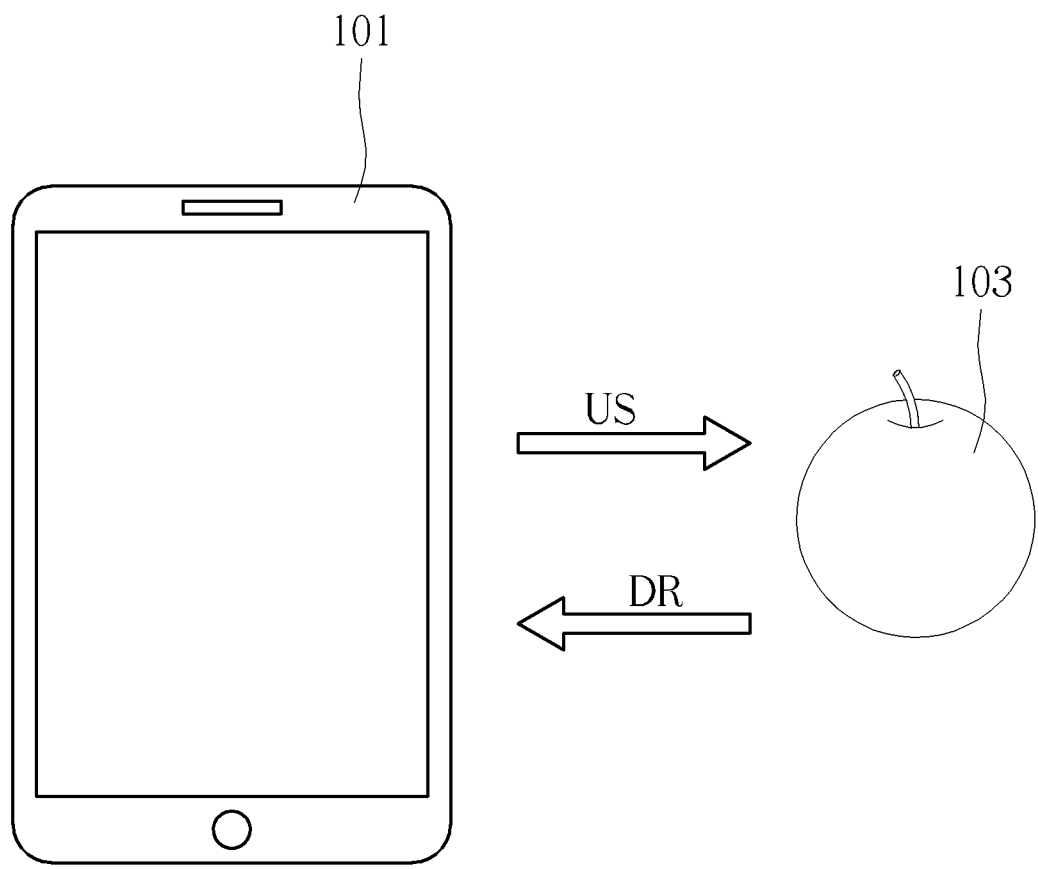
FIG. 1 is a schematic diagram illustrating an object analyzing method according to one embodiment of the present application.

FIG. 1 is a schematic diagram illustrating an object analyzing method according to one embodiment of the present application. As illustrated in FIG. 1, a portable electronic device 101 comprising an object analyzing system generates ultrasound US to a target object 103 and receives related detecting result DR from the target object 103. The detecting result DR can comprise, for example, at least one inside image for the target object 103 and/or inside state information for the target object 103. The target object 103 can be any type of object, for example, food, furniture, a part of building, or an electronic device. The inside state information can comprise any information related to the content inside the target object 103. In one embodiment, the inside state information comprises at least one of following information: sweetness, hardness, material quality and rot level. More details about the object analyzing method are described as below.

Figure 2A:
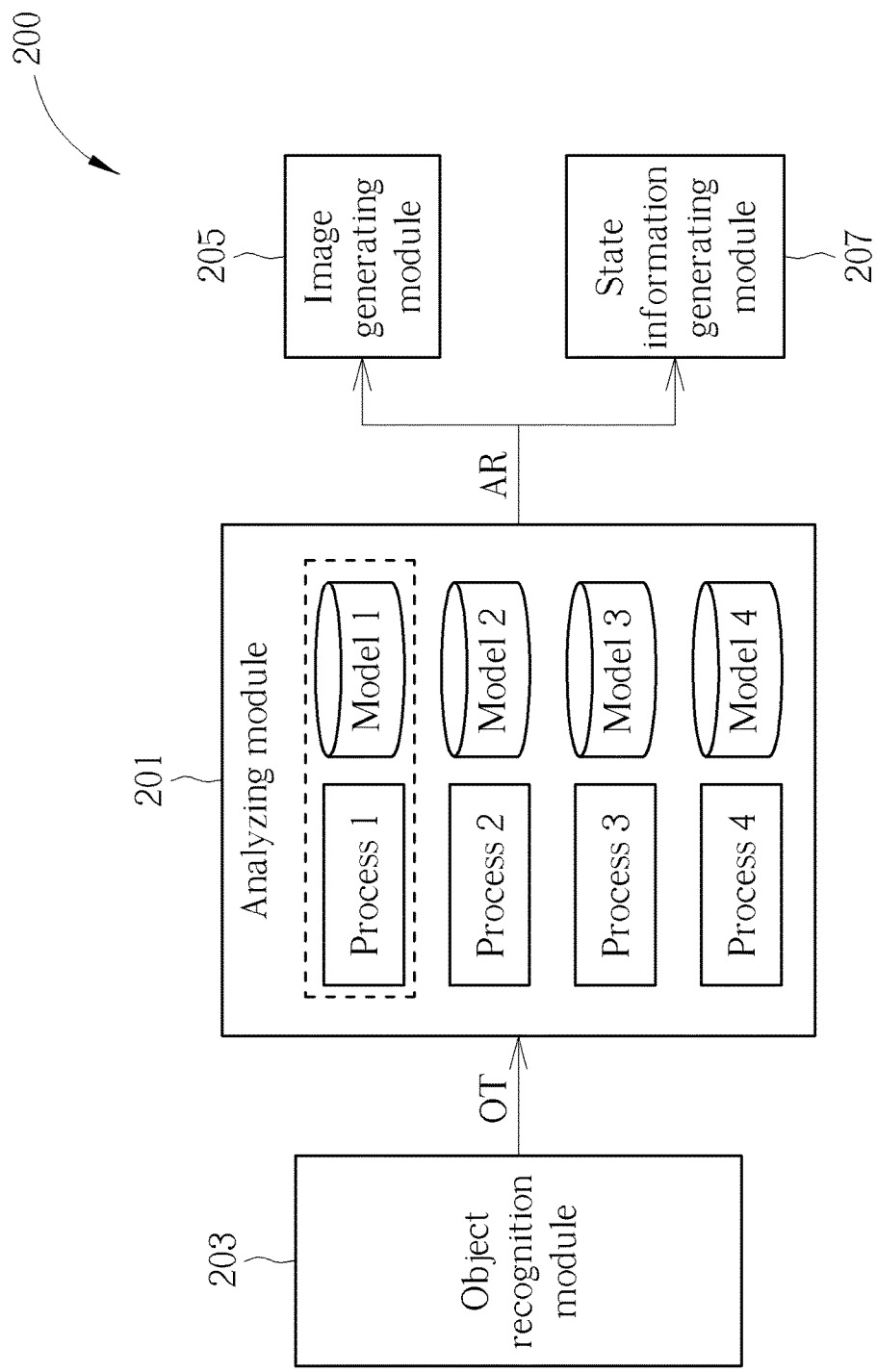
FIG. 2A, FIG. 2B are block diagrams illustrating object analyzing system according to different embodiments of the present application.

FIG. 2A is a block diagram illustrating an object analyzing system according to one embodiment of the present application. AS illustrated in FIG. 2A, the object analyzing system 200 comprises an analyzing module 201, an object recognizing module 203, an image generating module 205, and a state information generating module 207. The object recognizing module 203 is configured to recognize an object type OT. The analyzing module 201 is configured to perform following steps: applying at least one analyzing parameter extracting process (ex. process 1, process 2 . . . ) according to the object type OT for an target object, to extract at least one analyzing parameter for the target object; selecting least one analyzing model (ex. model 1, model 2 . . . ) according to the object type OT; and applying the selected analyzing model, to analyze the analyzing parameter and accordingly generate an analyzing result AR. For example, the object type OT indicates the target object is an apple. Accordingly, the analyzing module 201 applies the process 1 suitable for an apple to extract at least one analyzing parameter for the target object. After that, the analyzing module 201 applies the mode 1 suitable for an apple to analyze the analyzing parameter and accordingly generate an analyzing result AR.

Different analyzing parameter extracting processes can comprise different process parameters. The process parameters can comprise, for example, a processing frequency (ex. frame rate), an ultrasound frequency band, ultrasound emitting power, an ultrasound emitting direction, or decision thresholds. In one embodiment, the analyzing model is a classifier, for example, a rule-based classifier, or a machine learning classifier such as a Deep Neural Network (DNN) or a Support Vector Machine (SVM).

The image generating module 205 is configured to generate at least one inside image for the target object according to the analyzing result AR. Also, the state information generating module 207 is configured to generate the inside state information for the target object. However, the analyzing result AR is not limited to be applied for generating an inside image or inside state information. Besides, the object type OT is not limited to be generated by the object recognition module 203. For example, the object type OT can be generated via manually set by a user. Therefore, in one embodiment, the object analyzing system 200 comprises the analyzing module 201 but does not comprises the object recognition module 203, the image generating module 205, and the state information generating module 207.

In one embodiment, the inside state information is generated according to the analyzing result AR in a detect-inside mode and the inside image of the target object is generated according to the analyzing result AR in a see-through mode. In one embodiment, the object analyzing system automatically selects one of the detect-inside mode and the see-through mode according to the object type. That is, a more suitable mode is selected according to the object type. For example, if the object type indicates the target object is an apple, the detect-inside mode is selected since the user always wants to know if the apple is sweet or not rather than see the structure inside. For another example, if the object type indicates the target object is a wall, the see-through mode is selected since the user always wants to know the structure inside the wall rather than the inside state thereof. In another embodiment, the object analyzing system displays a selecting interface for selecting one of the detect-inside mode and the see-through mode. For example, if either the detect-inside mode or the see-through mode is suitable for the target object, the selecting interface can be displayed for a user to select one of the detect-inside mode and the see-through mode. On the contrary, if neither the detect-inside mode nor the see-through mode is suitable for the target object, the selecting interface can still be displayed as well. Additionally, in one embodiment, the object analyzing system can operate in the detect-inside mode and the see-through mode simultaneously, to generate the inside state information and the inside image.

In one embodiment, the image for the target object may be too blurred such that the object recognition module 203 cannot clearly recognize the target object. In such case, more than one possible analyzing parameter extracting processes and/or more than one possible analyzing models are applied to analyze the target object. By this way, more than one analyzing results AR are generated. Also, inside state information generated based on these analyzing results and/or inside images generated based on the analyzing results are displayed, such that the user can select one preferred detecting result.

Figure 2B:
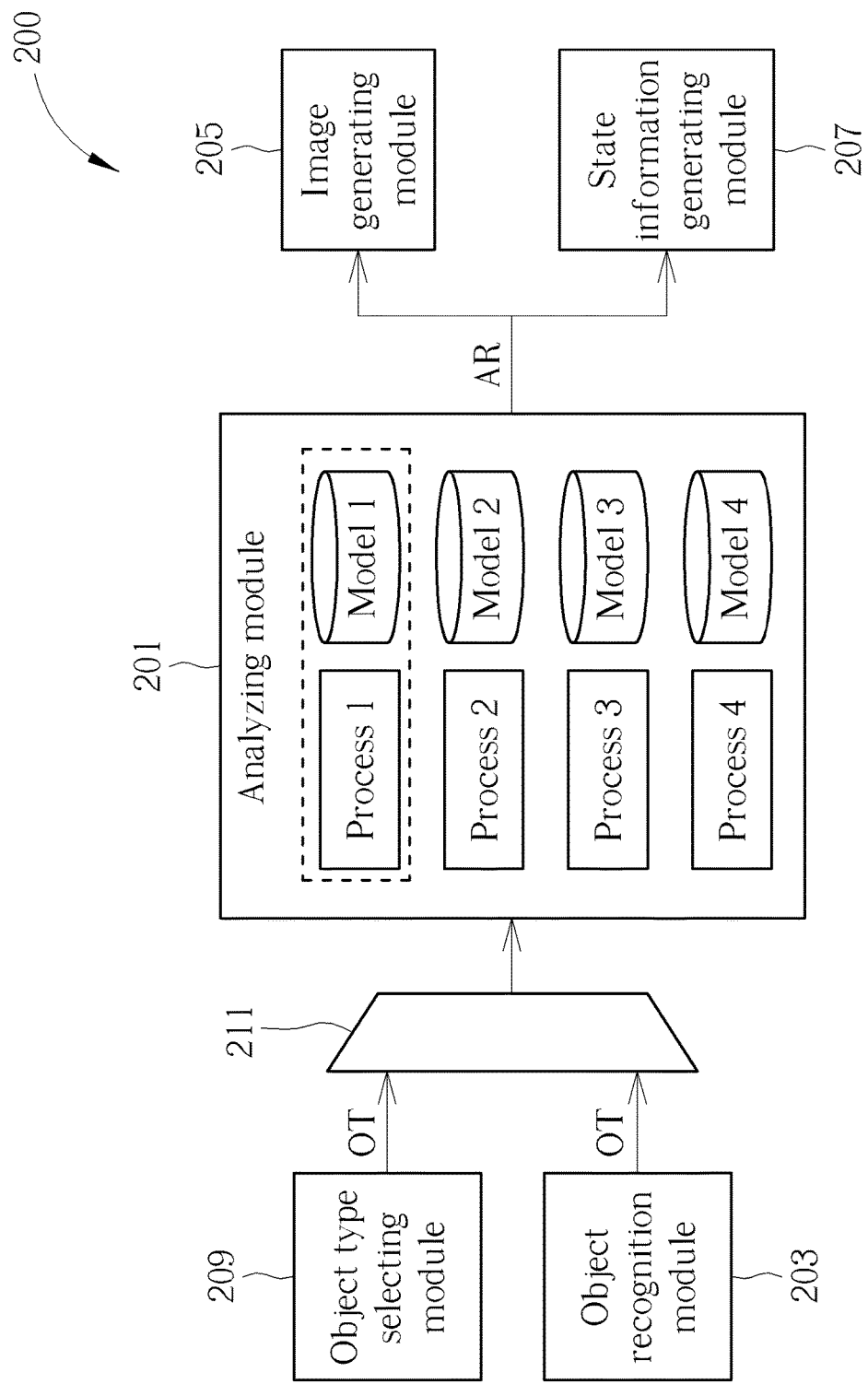

FIG. 2B is a block diagram illustrating object analyzing system according to another embodiment of the present application. As above-mentioned, the object type OT can be manually inputted by the user rather than generated by the object recognition module 203. In the embodiment of FIG. 2B, the object analyzing system 200 further comprises an object type selecting module 209, which is configured for a user to select the object type OT. Also, in the embodiment of FIG. 2B, the object analyzing system 200 further comprises a selector 211, which is configured to selectively output the object type OT from the object type selecting module 209 and the object recognition module 203. In one embodiment, the selector 211 is controlled by the light brightness surrounding the target object. For more detail, in such embodiment, the object recognition module 203 comprises a camera to capture an image for the target object and determines the object type according to the image. Accordingly, if the light is too dark such that the object recognition module 203 could not capture a clear image for the target object, the selector 211 will automatically switch to output the object type OT from the object type selecting module 209. Such steps can be summarized as: selecting a source for providing the object type according to light brightness surrounding the target object.

Figure 3:
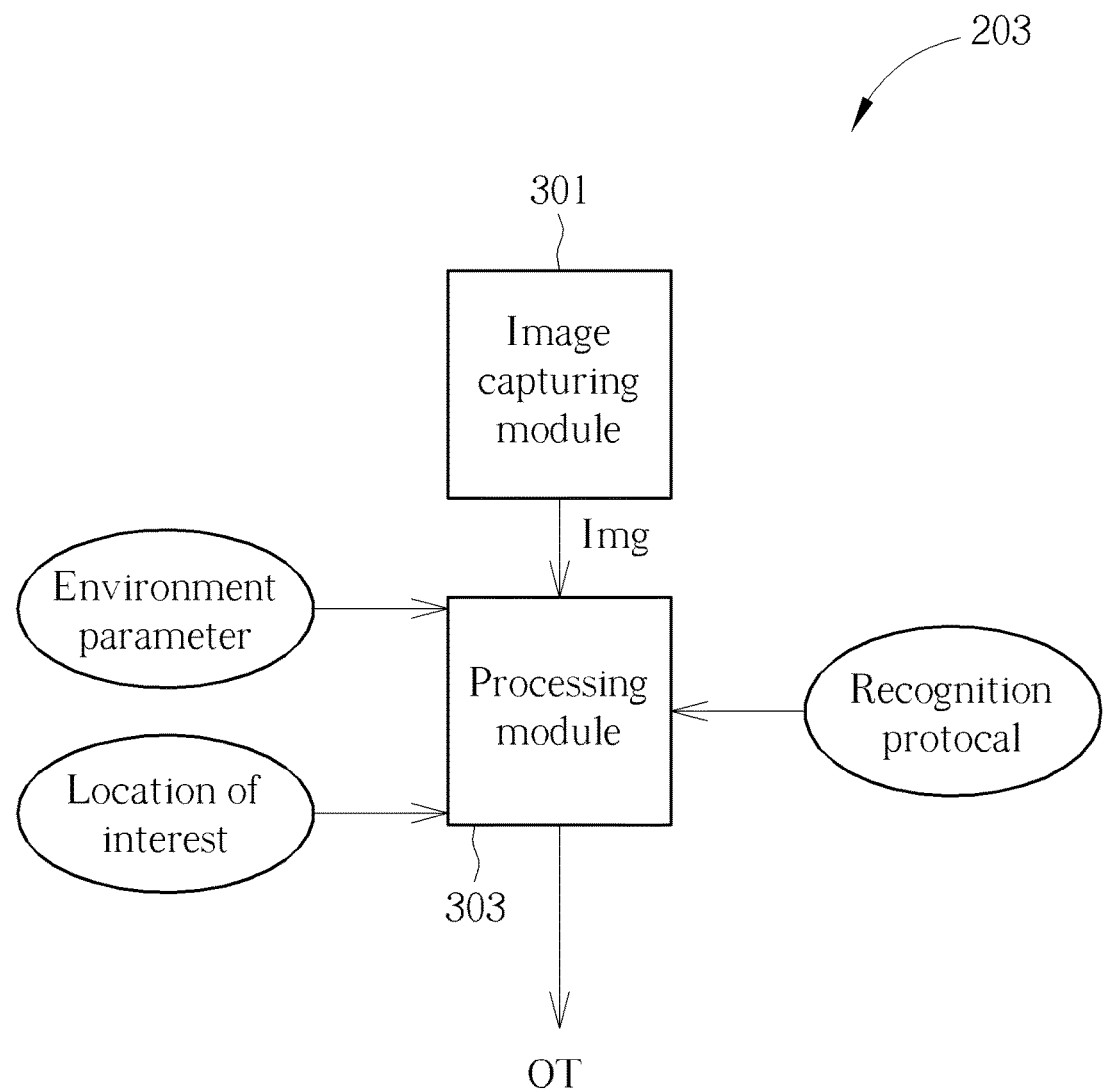
FIG. 3 is a block diagram illustrating an example for a detail structure for the object recognition module illustrated in FIG. 2A.

The above-mentioned object recognition module 203 can have different structures in different embodiments. In one embodiment, the object type OT is generated according to a captured image. FIG. 3 is a block diagram illustrating an example for a detail structure for the object recognition module illustrated in FIG. 2A. As illustrated in FIG. 3, the object recognition module 203 comprises an image capturing module 301 and a processing module 303. The image capturing module 301 (ex. a camera) is configured to capture an image Img for the target object. The processing module 303 receives the image Img and recognizes the target object via using a recognizing protocol. The target object can be recognized based on various rules, for example, based on the shape or the color of the target object.

The processing module 303 can further refer to other factors to determine the object type OT. For example, in one embodiment, the processing module 303 further refers location of interest to generate the object type OT. The location of interest indicates a part of the target object which is desired to be analyzed.

Figure 4A:
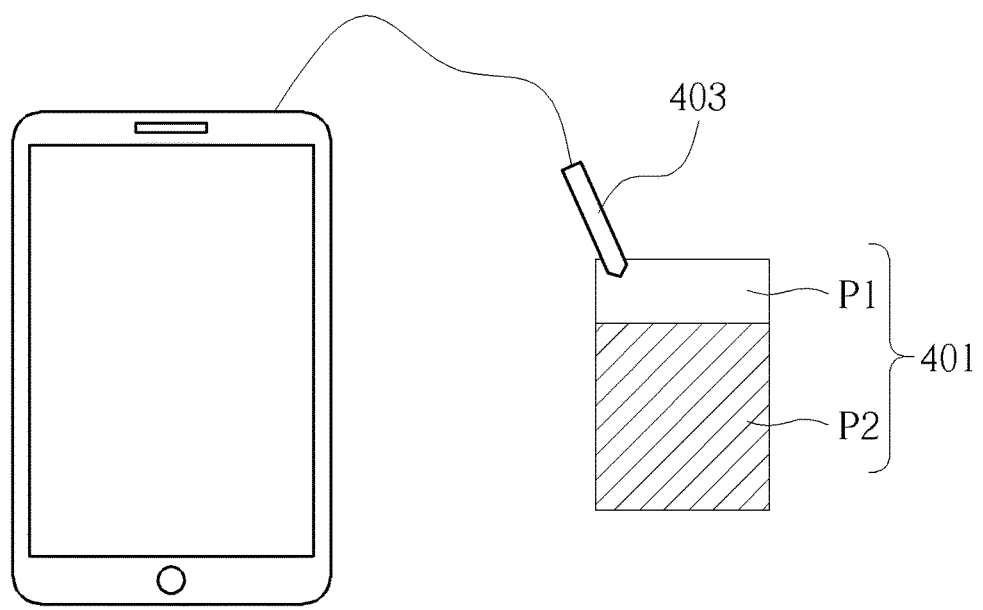
FIG. 4A and FIG. 4B are schematic diagrams illustrating how to determine location of interest illustrated in FIG. 3.
Figure 4B:
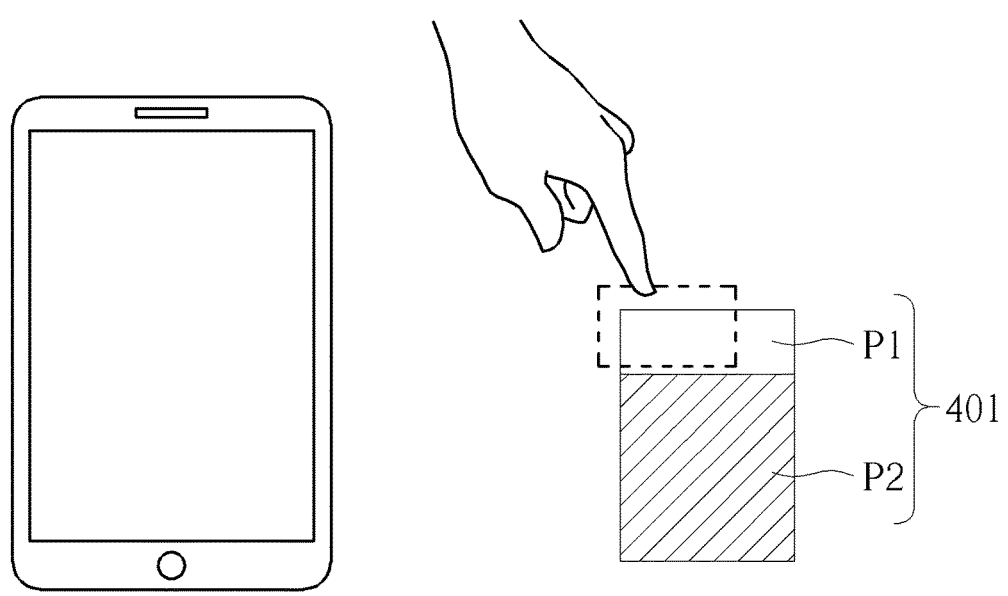

FIG. 4A and FIG. 4B are schematic diagrams illustrating how to determine location of interest illustrated in FIG. 3. In FIG. 4A, a transducer 403 is applied to choose the location of interest. The part which the transducer 403 touches or approaches is the location of interest. In FIG. 4B, the location of interest is the part which is circled. As illustrated in FIG. 4A and FIG. 4B, the target object 401 is a box having different parts P1, P2, which are made with different materials. Therefore, the object type will be different if the locations of interest are at different ones of parts P1, P2. If the location of interest is determined, a corresponding part for an image of the target object will be segmented for following processing.

In another embodiment, the processing module 303 further refers to environment parameter for environment surrounding the target object to determine the object type OT. In one embodiment, the environment parameter is a location for the target object. For example, if the environment parameter indicates the target object is in a furniture store, the target object is possibly furniture. For another example, if the environment parameter indicates the target object is in a market or a restaurant, the target object is possibly food. Accordingly, the environment parameter can be helpful for determining the object more precisely.

Figure 5:
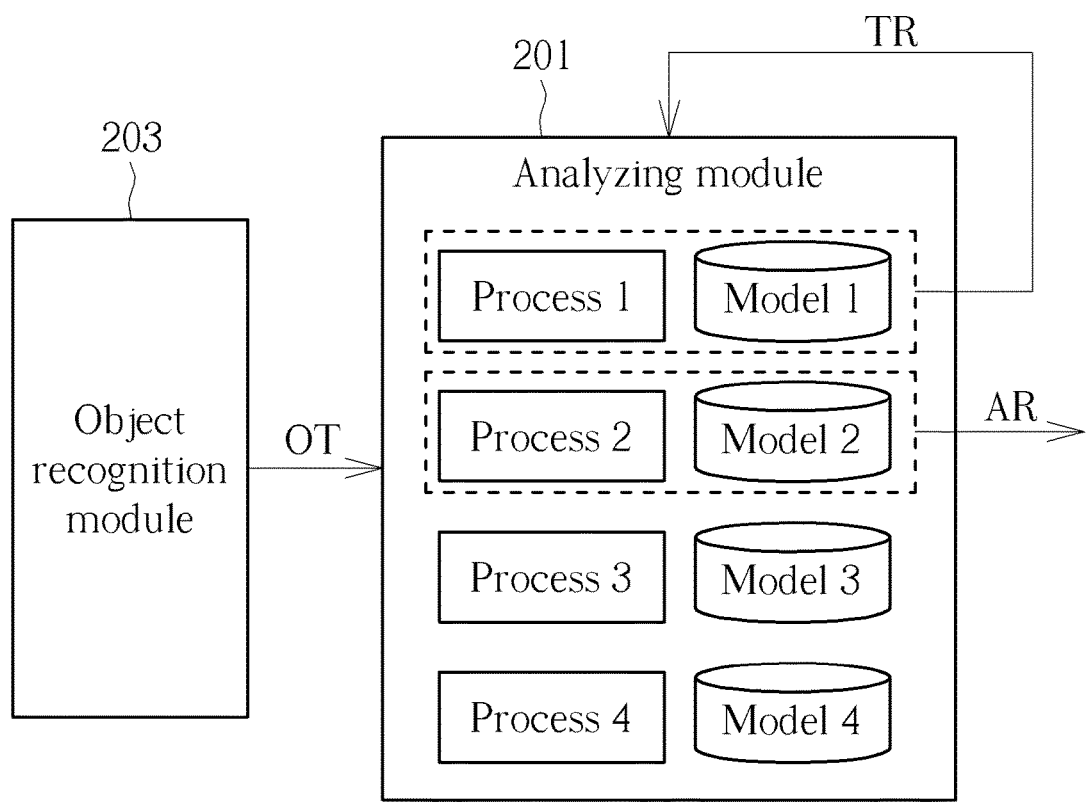
FIG. 5 is a block diagram illustrating an object analyzing system according to another embodiment of the present application.

Besides the above-mentioned analyzing steps, other steps can be further performed to the target object to acquire a more accurate analyzing result. FIG. 5 is a block diagram illustrating an object analyzing system according to another embodiment of the present application. In this embodiment, a testing process is firstly performed according to the object type before applying the analyzing parameter extracting process and selecting the model, to generate a test result TR. In one embodiment, the testing process applies the analyzing parameter extracting process "process 1" and the analyzing model "model 1". However, the testing process is not limited to apply an analyzing parameter extracting process and an analyzing model. Also, in one embodiment, other factors such as a temperature is also considered while performing the test process.

After that, an analyzing parameter extracting process is selected to extract the analyzing parameter of the target object according to the test result, and/or a analyzing model is selected according to the test result. In one embodiment, the analyzing module 201 further refers an environment parameter such as a temperature to perform the testing process. Examples for such operations will be described for more detail later.

Figure 6:
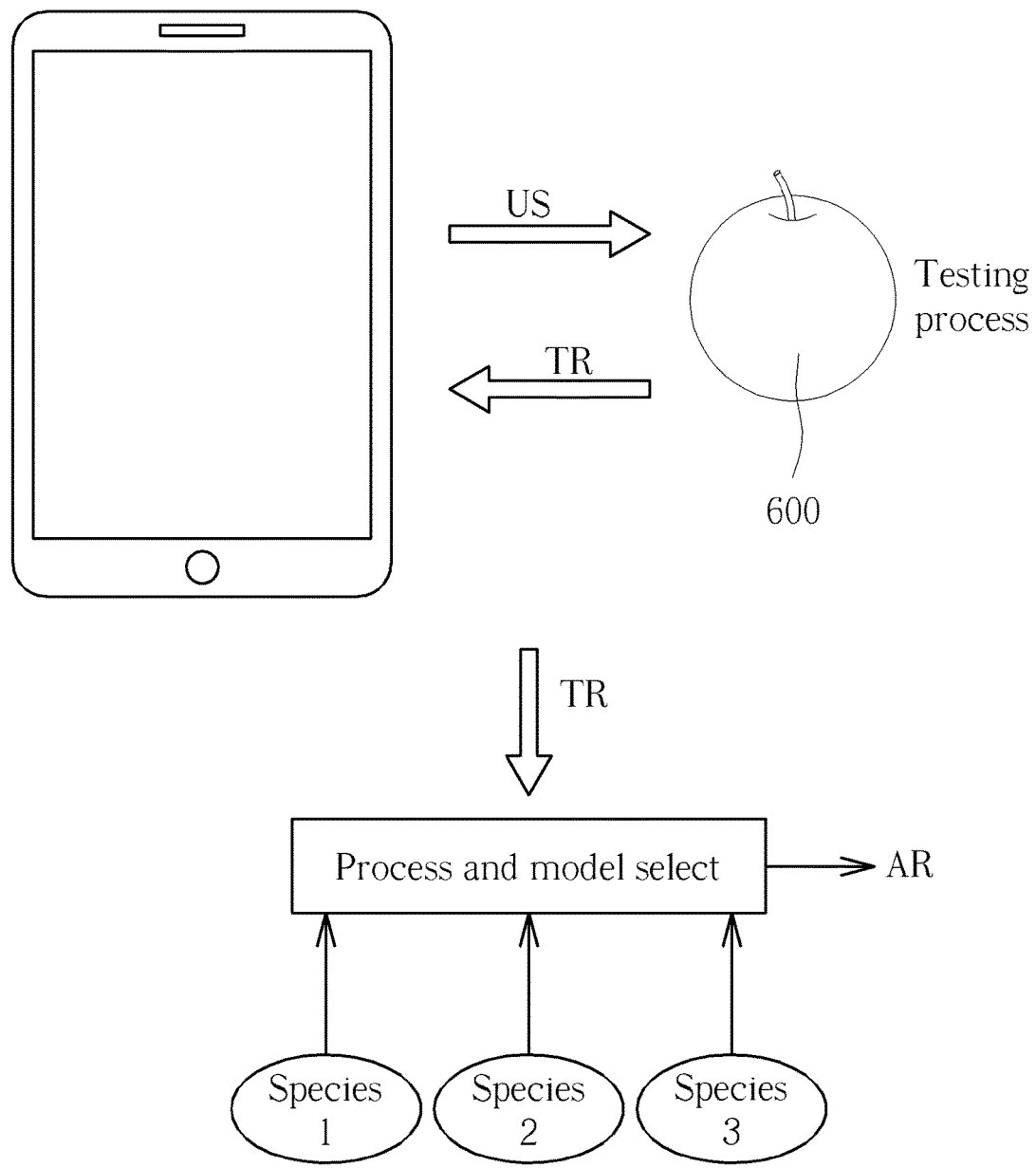
FIG. 6 is a schematic diagram illustrating the operations for the embodiment illustrated in FIG. 5.

FIG. 6 is a schematic diagram illustrating the operations for the embodiment illustrated in FIG. 5. In such embodiment, the target object 600 is determines as an apple via the testing process. However, the apples may be different species, or have different maturity. In such case, the analyzing parameter extracting process and/or the analyzing model can be more precisely selected according to the testing result. For example, select the analyzing parameter extracting process and/or the analyzing model suitable for species 1, species 2, or species 3. By this way, the analyzing result AR can be more accurate.

Two other more detail examples are described as below. In one example, the user wants to detect the defect inside wall, or the water leaking inside the wall. If the object recognizing module detects the object type is "wall" or the user select the object type as "wall", the object analyzing module selects the analyzing parameter extracting process and the analyzing model suitable for "Wall" to perform the testing process. However, different walls may have different strength of concrete, thus may have different index of refraction and different reflectivity. Therefore, the object analyzing module will select more suitable analyzing parameter extracting process and/or the analyzing model according to the testing result to analyze the wall.

In another example, the user wants to detect the sweetness for a water melon. If the object recognizing module detects the object type is "water melon" or the user select the object type as "water melon", the object analyzing module selects the analyzing parameter extracting process and the analyzing model suitable for "water melon" to perform the testing process. However, different water melons or different species of water melons may have different epidermal thickness and different flesh color, thus may have different index of refraction and different reflectivity. Therefore, the object analyzing module will select more suitable analyzing parameter extracting process and/or the analyzing model according to the testing result to analyze the watermelon.

Please note, the above-mentioned embodiments apply ultrasound and a portable electronic device as examples for explaining. However, the object analyzing method provided by the present application can be implemented via other mechanisms such as infrared or x-ray. Also, the above-mentioned object analyzing method is not limited to be applied via a portable electronic device.

Therefore, one object analyzing method provided by the present application can be summarized as: An object analyzing method, applied to an object analyzing system, comprising: applying at least one analyzing parameter extracting process (ex. process 1, process 2 . . . in FIG. 2A) according to an object type (ex. OT in FIG. 2A) for an target object, to extract at least one analyzing parameter for the target object; (b) selecting least one analyzing model (ex. model 1, model 2 . . . in FIG. 2A) according to the object type; and (c) applying the analyzing model selected in the step (b), to analyze the analyzing parameter and accordingly generate an analyzing result (ex. AR in FIG. 2A).

In view of above-mentioned embodiments, the function of object analyzing can be performed via a portable electronic device, thus is convenient for a user. Besides, the analyzing parameter extracting process and the analyzing model can be selected according to a testing result. By this way, the analyzing result can be more precise.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object analyzing method, applied to an object analyzing system, comprising:
    (a) applying at least one analyzing parameter extracting process according to an object type for a target object, to extract at least one analyzing parameter for the target object;
    (b) selecting at least one analyzing model according to the object type;
    (c) applying the analyzing model selected in the step (b), to analyze the analyzing parameter and accordingly generate an analyzing result;
    (d) generating inside state information for the target object according to the analyzing result in a detect-inside mode; and
    (e) drawing an inside image of the target object according to the analyzing result in a see-through mode.

2. The object analyzing method of claim 1, wherein the step (a) applies ultrasound to extract the analyzing parameter.

3. The object analyzing method of claim 1, further comprising:
    automatically selecting one of the detect-inside mode and the see-through mode according to the object type, or displaying a selecting interface for selecting one of the detect-inside mode and the see-through mode according to the object type.

4. The object analyzing method of claim 1, wherein the step (b) applies a plurality of analyzing models to analyze the analyzing parameter to generate a plurality of analyzing results, wherein the object analyzing method comprises:
　　displaying inside state information generated based on the analyzing results, or displaying inside images generated based on the analyzing results.

5. The object analyzing method of claim 1, further comprising performing following steps before the step (a):
　　capturing an image of the object; and
　　determining the object type according to the image of the object.

6. The object analyzing method of claim 1, wherein the step (c) acquires at least one following inside state information of the target object according to the analyzing model: sweetness, hardness, material quality, and rot level.

7. The object analyzing method of claim 1, further comprising:
　　applying a testing process according to the object type to generate a test result before the step (a);
　　wherein the step (a) applies the analyzing parameter extracting process to extract the analyzing parameter according to the test result, and/or wherein the step (b) selects the least one analyzing model according to the test result.

8. The object analyzing method of claim 7, wherein the testing process is performed via at least one the analyzing parameter extracting process and at least one the analyzing circuit.

9. An object analyzing system, comprising:
　　an analyzing circuit, configured to perform following steps:
　　(a) apply at least one analyzing parameter extracting process according to an object type for a target object, to extract at least one analyzing parameter for the target object;
　　(b) select at least one analyzing model according to the object type; and
　　(c) apply the analyzing model selected in the step (b), to analyze the analyzing parameter and accordingly generate an analyzing result;
　　wherein the object analyzing system further comprises an image generating module and a state information generating module, wherein the image generating module generates inside state information for the target object according to the analyzing result in a detect-inside mode, wherein the state information generating module draws an inside image of the target object according to the analyzing result in a see-through mode.

10. The object analyzing system of claim 9, wherein the step (a) applies ultrasound to extract the analyzing parameter.

11. The object analyzing system of claim 9, wherein the object analyzing system automatically selects one of the detect-inside mode and the see-through mode according to the object type, or displays a selecting interface for selecting one of the detect-inside mode and the see-through mode according to the object type.

12. The object analyzing system of claim 9, wherein the step (b) applies a plurality of analyzing models to analyze the analyzing parameter to generate a plurality of analyzing results, wherein the object analyzing system displays inside state information generated based on the analyzing results, or displays inside images generated based on the analyzing results.

13. The object analyzing system of claim 9, further comprising an object recognition module configured to capture an image of the object and to determine the object type according to the image of the object.

14. The object analyzing system of claim 9, wherein the step (b) acquires at least one following inside state information of the target object according to the analyzing model: sweetness, hardness, material quality, and rot level.

15. The object analyzing system of claim 9,
　　wherein the analyzing circuit applies a testing process according to the object type to generate a test result before the step (a);
　　wherein the step (a) applies the analyzing parameter extracting process to extract the analyzing parameter according to the test result, and/or wherein the step (b) selects the analyzing model according to the test result.

16. The object analyzing system of claim 15, wherein the analyzing circuit performed the testing process via applying at least one the analyzing parameter extracting process and at least one the analyzing circuit.

* * * * *